United States Patent
Chauvin et al.

(10) Patent No.: US 6,747,575 B2
(45) Date of Patent: Jun. 8, 2004

(54) PARKING METER SMART HOUSING WITH ELECTRONIC MEMORY

(75) Inventors: Greg Chauvin, Harchett Lake (CA); Neil Erskine, Halifax (CA)

(73) Assignee: J.J. Mackay Canada Limited (CA)

( * ) Notice: Subject to any disclaimer, the term of this patent is extended or adjusted under 35 U.S.C. 154(b) by 0 days.

(21) Appl. No.: 10/317,414

(22) Filed: Dec. 12, 2002

(65) Prior Publication Data

US 2003/0112151 A1 Jun. 19, 2003

Related U.S. Application Data

(60) Provisional application No. 60/339,467, filed on Dec. 14, 2001.

(51) Int. Cl.[7] ............................. G08G 1/14; G06F 19/00
(52) U.S. Cl. ................................. 340/932.2; 340/693.5; 340/693.12; 340/5.9; 340/309.16; 194/217; 194/205; 368/7; 368/90; 235/375; 235/381; 705/13; 705/418
(58) Field of Search ............................. 340/932.2, 519, 340/825.22, 5.91, 825.5, 309.16, 693.5, 693.6, 693.12; 194/217, 216, 205, 900, 902; 368/7, 90; 235/380, 381, 375; 705/13, 418

(56) References Cited

U.S. PATENT DOCUMENTS

| | | | | |
|---|---|---|---|---|
| 4,031,991 A | | 6/1977 | Malott | ........................ 194/1 R |
| 5,442,348 A | * | 8/1995 | Mushell | .................... 340/932.2 |
| 5,500,517 A | * | 3/1996 | Cagliostro | ................... 235/486 |
| 5,740,050 A | * | 4/1998 | Ward, II | .................... 340/932.2 |
| 5,805,083 A | | 9/1998 | Sutton et al. | ............. 340/932.2 |
| 5,841,369 A | | 11/1998 | Sutton et al. | ............... 34/932.2 |
| 6,111,522 A | * | 8/2000 | Hiltz et al. | ............... 340/932.2 |
| 2002/0162884 A1 | * | 11/2002 | Speas et al. | ................. 235/380 |

* cited by examiner

*Primary Examiner*—Donnie L. Crosland
(74) *Attorney, Agent, or Firm*—Hayes Soloway P.C.

(57) ABSTRACT

The invention is directed to an electronic parking meter and a method of configuring an electronic parking meter. In addition to a meter housing and an electronic metering mechanism within the housing, the parking meter includes a memory positioned within the housing separate from the electronic metering mechanism for storing configuration information associated with a pre-selected group of one or more electronic meters. When the electronic metering mechanism is replaced, the replacement metering mechanism that is inserted into the housing need only be coupled to the separate memory in order to have the configuration information of the specific meter downloaded into it. The configuration information includes parking meter location information and/or parking restriction information. The separate memory, which may include a real time clock chip and may alternately be located in the meter's electronic lock, can also be used to store current meter status information that is accessible from the exterior of the meter housing.

24 Claims, 3 Drawing Sheets

PARKING METER SMART HOUSING WITH ELECTRONIC MEMORY

This application claims the benefit of U.S. Provisional Patent Application Serial No. 60/339,467 filed on Dec. 14, 2001.

FIELD OF THE INVENTION

The invention relates generally to electronic parking meters, and more particularly to facilitating the maintenance of electronic meters.

BACKGROUND OF THE INVENTION

Many sites that deploy electronic parking meters may also include a combination of electronics placed with the electronic metering mechanism within the parking meter housing, such as an electronic lock. The electronic metering mechanism and the electronic lock are linked such that a memory located within the lock is kept current in terms of what coins have been dropped through the electronic meter. The electronic lock will only permit access to the cash when an encrypted challenge is authenticated, and once accessed the lock will also dump the coin count data.

The electronic metering mechanism has a peripheral port to which external devices can be attached, the electronic lock is just one of those. During the operational life cycle of an electronic meter, the meter can be subjected to much physical use, and periodic maintenance is required. In many cases the electronic metering mechanism will be removed from the housing because of damage caused by physical abuse, vandalism or normal wear and tear, or for maintenance that is best carried out back in the shop.

Whenever an electronic metering mechanism is removed from the housing, another must be placed into the same physical housing. The physical housing location usually is part of a group of meter housings that geographically represents a unique configuration with regard to rate (cost of parking per hour), time limit (maximum time that can be purchased), special periods (on/off times or rates that change at different times), and the like. In some cases, the specific meter location will have unique attributes to those meters around it. An example would be the one or two special limited parking meters placed in front of some businesses to encourage high turnover. When a new metering mechanism is placed in the housing, it must be configured to behave like the other electronic meters within that geographical housing group or in some cases to that specific location. In order to reconfigure an electronic metering mechanism, the person doing the maintenance must first determine geographically where he is and then once he is sure, he reconfigures the meter so that it follows the rules associated with that geographical group of housings around him, this can be done by taking a portable handheld device and reprogramming the meter while in the field.

The disadvantage of doing this type of activity in the field is that the maintainer must always have the reprogramming unit with him, be trained in it's use, and be knowledgeable as to what geographical configuration information to place into the replacement metering mechanism. In many cases the replacement cannot be done for lack of the proper tools, or the replacement is done with the wrong data and configuration information.

Therefore, there is a need for an electronic parking meter system in which the electronic metering mechanism is automatically configured on placement in its housing.

SUMMARY OF THE INVENTION

The invention is directed to an electronic parking meter comprising a meter housing, an electronic metering mechanism within the housing, a memory positioned within the housing separate from the electronic metering mechanism for storing configuration information associated with a pre-selected group comprising one or more electronic meters and an interface for coupling the memory to the electronic metering mechanism for downloading the configuration information into the electronic metering mechanism.

In accordance with another aspect, the invention is directed to a method of configuring an electronic parking meter having a replaceable electronic metering mechanism within a meter housing, comprising the steps of positioning a memory within the meter housing separate from the electronic metering mechanism, storing configuration information associated with a pre-selected group of one or more electronic meters within the memory and coupling the memory to the electronic metering mechanism for loading the configuration information into the electronic metering mechanism.

With regard to a further aspect, the invention is directed to a method of configuring an electronic parking meter having a replaceable electronic metering mechanism within a meter housing, comprising the steps of positioning a memory within the housing separate from the electronic metering mechanism wherein configuration information associated with a pre-selected group of one or more meters is stored within the memory, and coupling the memory to the electronic metering mechanism for loading the configuration information into the electronic metering mechanism.

In accordance with another aspect, the invention is directed to a method of replacing an electronic metering mechanism within a meter housing of an electronic meter, comprising the steps of removing the electronic metering mechanism from the meter housing, maintaining configuration information associated with the electronic meter in storage in the meter housing, inserting a replacement electronic metering mechanism within the meter housing and loading the configuration information stored in the meter housing into the replacement electronic metering mechanism.

In accordance with a further aspect of the invention, current parking meter status information is stored in the separate housing memory and the memory includes an interface for accessing the memory from the exterior of the housing.

In accordance with a further aspect of the invention, the housing memory includes a real time clock chip.

In accordance with another aspect of the invention, the housing memory is located within an electronic lock that provides access to cash accumulated within the meter housing.

With regard to a further aspect of the invention, the pre-selected group of electronic meters is determined by location, such as geographical location. In addition, the configuration information includes parking meter location and/or parking restriction information. This information comprises one or more of the following: city defined post location number, street name and closest civic number, latitude & longitude coordinates as defined by a GPS system, parking rates, parking time limit, allowed parking periods, payment required parking periods.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
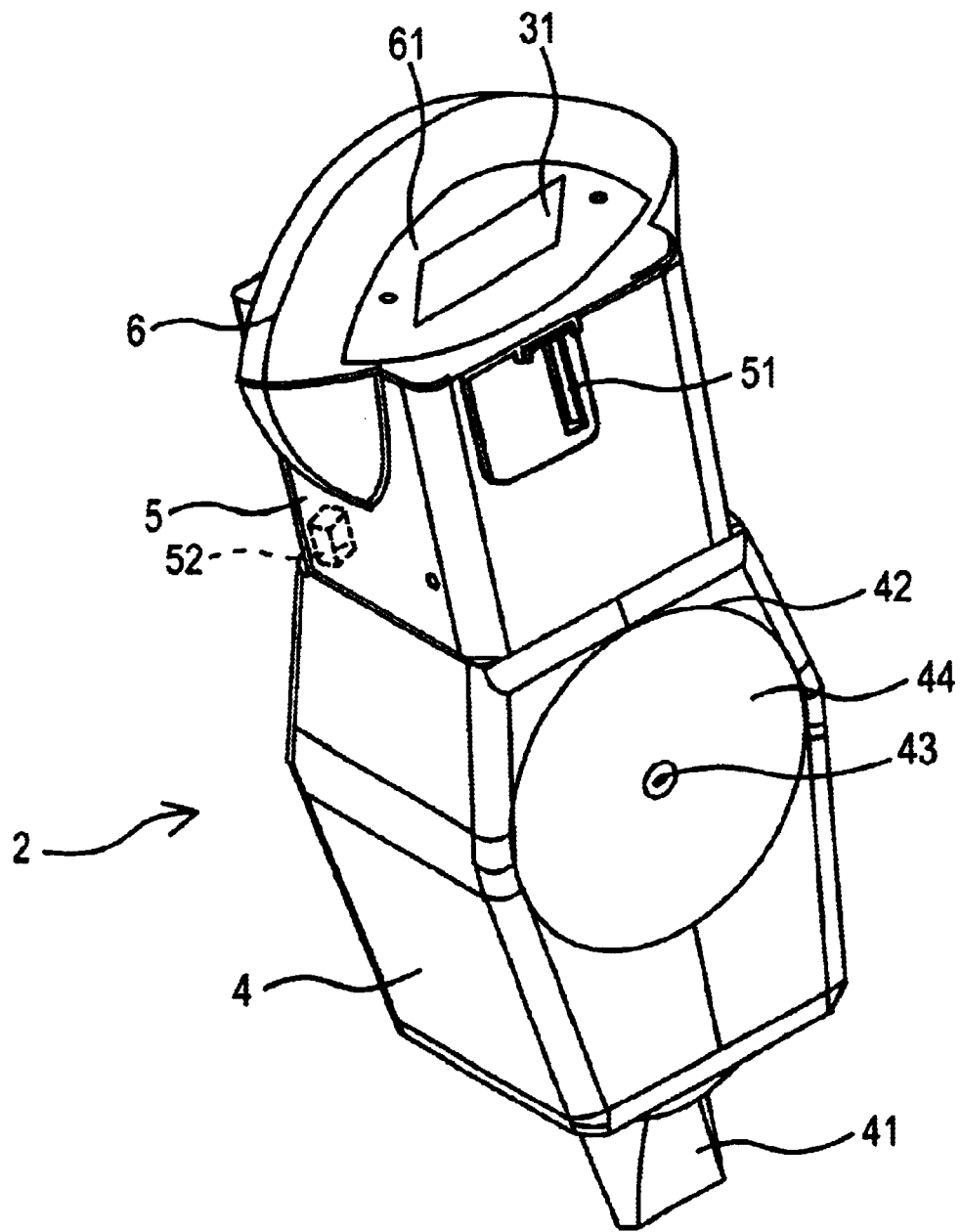
FIG. 1 illustrates an electronic meter housing.
Figure 2:
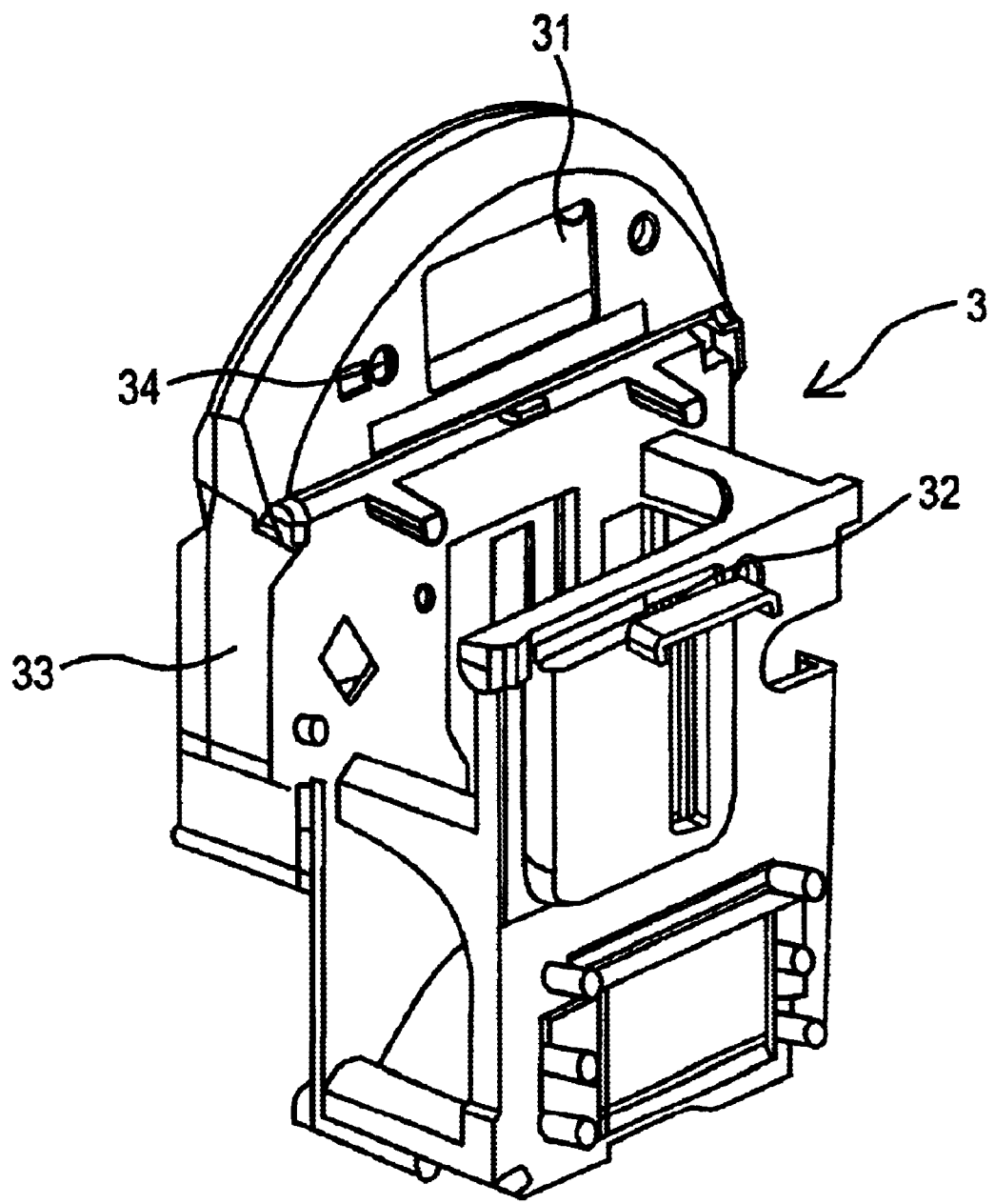
FIG. 2 illustrates an electronic metering mechanism.

An electronic parking meter 1 comprises two basic components, namely a meter housing 2 illustrated in FIG. 1 and an electronic metering mechanism 3 illustrated in FIG. 2; the metering mechanism 3 fits inside the housing 2. The housing 2 may include a lower housing 4, an upper housing 5 and a meter cap 6. The lower housing 4 is adapted to be attached to a pedestal using a pillar 41 and includes a cash storage box, which is located and locked within an opening 42 in housing 4 by a door assembly 44 having a lock 43. Lock 43 may be a mechanical lock or an electronic lock with memory capable of downloading coin count data to an electronic key, which is used to unlock the door assembly 44 to access the coins. The upper housing 5 receives the electronic metering mechanism 3 and includes a payment slot 51. The cap 6, which is hinged and locks to the upper housing 5, includes a transparent dome 61, made of LEXAN™ or some similar type of highly durable material, through which a time display 31 is visible. As illustrated in FIG. 2, the metering mechanism 3 includes a time display 31, a coin and/or card detector 32 as well as a main board assembly with a processor 33 for operating the electronic meter 1.

Figure 3:
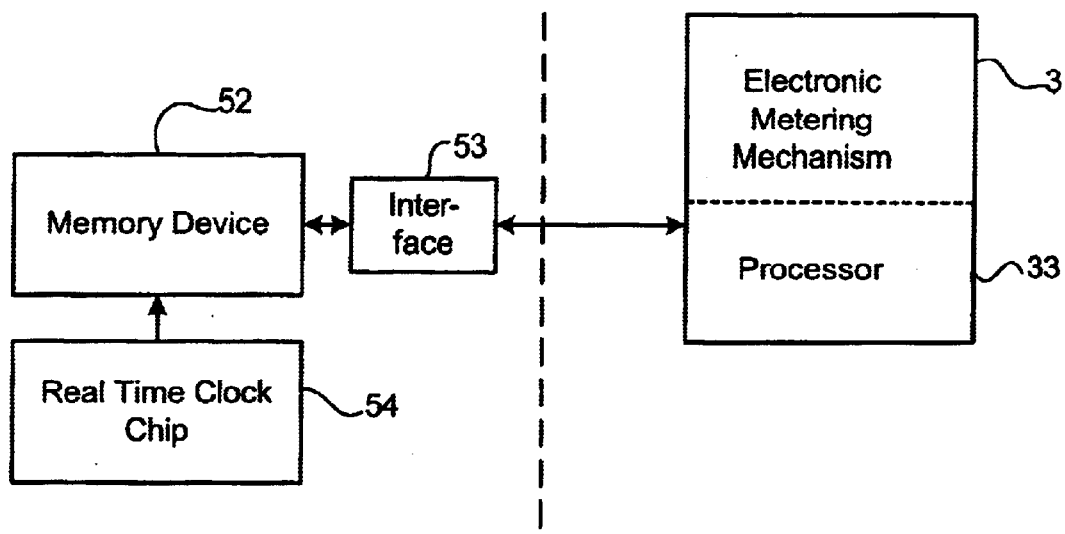
FIG. 3 is a schematic of the electronic meter in accordance with the present invention.

In accordance with the present invention, as further shown schematically in FIG. 3, the configuration information of the electronic parking meter 1 is maintained with the housing 2 whenever the electronic metering mechanism 3 is removed. The configuration information, which may be common to a pre-selected number of electronic meters that are selected by geographical area or some other criteria, is automatically loaded into the replacement electronic metering mechanism 3 when it is placed into the particular meter housing 2. This can be accomplished by locating a memory device 52 in any part of the housing 2, such as the upper housing 5 or the lower housing 4, so that it can be disconnected from the processor 33 in the metering mechanism 3 and will remain with the housing 2 when the electronic metering mechanism 3 is removed from the housing. The memory device 52 is preferably located in the upper housing 5 as shown in FIG. 1 for practical purposes to be near the main board assembly in the electronic metering mechanism 3.

This memory device 52 retains the configuration information of the specific electronic meter 1 in which it is mounted, the configuration information may be common to the configuration information of a pre-selected number of other meters. The memory device passes the configuration information to the electronic metering mechanism 3 through an interface 53 such as a hardwired connection or a close coupled connection to the metering mechanism 3. This interface 53 could be connected to a peripheral port on the metering mechanism 3.

Figure 4:
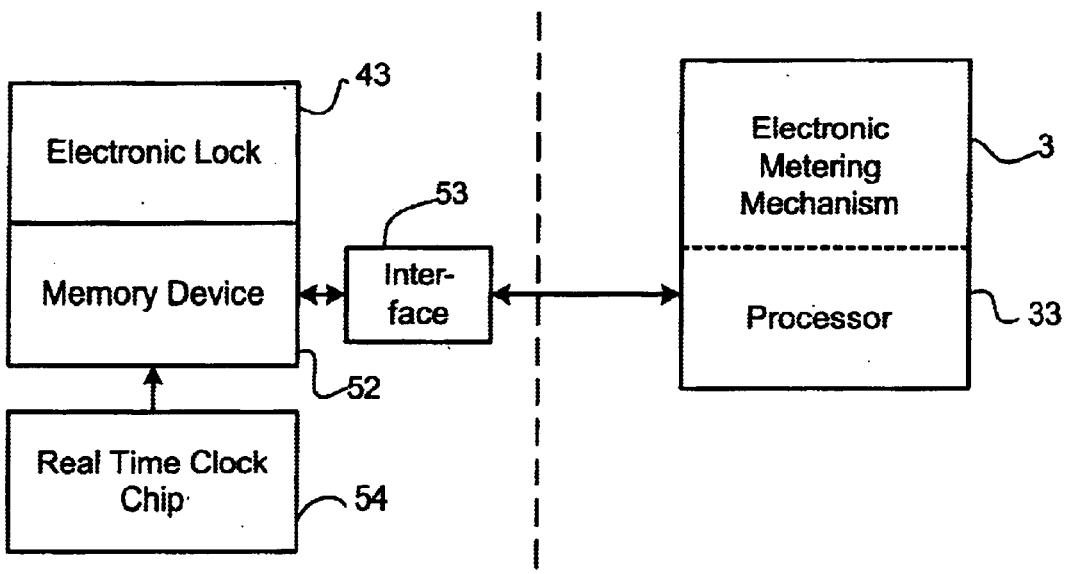
FIG. 4 is a schematic of a further embodiment of the present invention.

The memory device 52 is of the type that can have its contents electrically read and written by the metering mechanism 3 or a suitable configuration device. It further has a memory type that is non-volatile in that it does not require power to retain the memory contents. An example of such a memory device 52 to retain the meter configuration information would be the Dallas Semiconductor I-Button (www.ibutton.com), which is a small simple two wire device, the I-Button is about the size of a small watch/ camera battery. It can readily be located within the upper housing 5 such that it is close to the processor 33 to which it can be connected through the interface 53. Alternately, as illustrated in FIG. 4, the memory device 52 may be made part of the memory found in the electronic lock 43, which remains with the lower housing 4 when the electronic metering mechanism 3 is removed.

The essential aspect of the present invention is that the memory device 52 remains with the housing 2 and is not removed when the electronic metering mechanism 3 is removed. A metering mechanism 3 that replaces the one requiring maintenance will only need to be linked with the internal memory device 52 that retains the configuration information. Once it links to the memory device 52, it takes on the configuration of the removed metering mechanism 3, which is as defined within the memory device 52. The configuration information includes parking meter location information and/or restriction information such as the City defined post location number, street name and closest civic number, latitude & longitude coordinates as defined by a GPS system, as well as parking restrictions as defined for that location such as parking rates, parking time limit, allowed parking periods, payment required parking periods. The memory device 52 can be programmed or updated either from an explicit command from the metering mechanism 3, or from utility programming devices when the electronic meters are first deployed.

The electronic parking meter "Smart Housing" retains meter configuration information, but may also be adapted to retain current parking meter status information, as well as other current information such as coin count data, on the memory device 52, which is fixed to the housing 2, remote from the electronic metering mechanism 3. In this way, once the electronic metering mechanism 3 is configured by the information from the memory device 52, the memory device 52 does not have an active role in the functioning or the operation of the electronic metering mechanism 3. As mentioned above however, the electronic metering mechanism 3 may periodically download information, such as the current status or coin count data, to the memory device 52 for storage. Further as illustrated in FIG. 3, a real time clock chip 54 can also be associated with the memory device 52 such that the current time may be applied to the replacement electronic metering mechanism 3. However, the clock chip 54 will require a power source, such as a small battery, to keep it active and accurate. Memory device 52 may further be adapted to be accessed from the exterior of the housing 2 through an exterior memory reader, which may read the configuration information as well as the status information in memory 52. However, as the memory 52 is always coupled to the electronic metering mechanism 3 when the metering mechanism 3 is placed into the housing 2, the configuration information will always be passed to the electronic metering mechanism 3 when the memory device 52 is initially coupled to it.

Therefore, the main advantage of the present invention is that a replacement electronic metering mechanism 3 will be configured automatically once the memory device 52 is connected to it without the need for extensive knowledge or expertise by the electronic meter maintainer, or special configuration tools. However, in addition, this arrangement has the further advantage that the electronic metering mechanism 3 may be reconfigured by replacing the memory device 52 in the electronic meter 1. Thus if a parking authority decides that the configuration information in a number of electronic meters in an area is to be changed, the maintainer may be given a number of memory devices 52 with the new configuration information and use them to replace the existing memory devices 52 in the meters in question. Once again, the maintainer does not need extensive knowledge or expertise to reconfigure the electronic meters.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. An electronic parking meter comprising:

a meter housing;

a replaceable electronic metering device within the housing;

a memory device mounted within the housing separate from the replaceable electronic metering device for storing configuration information associated with a pre-selected group comprising one or more electronic meters; and an interface device for coupling the memory device to the replaceable electronic metering device for downloading the configuration information into the replaceable electronic metering device.

2. An electronic parking meter as claimed in claim 1 wherein the memory device includes memory for storing parking meter status information.

3. An electronic parking meter as claimed in claim 2 wherein the memory device includes an access port for providing access to it from the exterior of the housing.

4. An electronic parking meter as claimed in claim 1 wherein the memory device includes a real time clock chip.

5. An electronic parking meter as claimed in claim 1 further comprising an electronic lock for providing access to cash accumulated within the meter housing, wherein the memory device is located within the electronic lock.

6. An electronic parking meter as claimed in claim 1 wherein the configuration information includes parking meter location and/or parking restriction information.

7. An electronic parking meter as claimed in claim 6 wherein the configuration information is selected from the group consisting of one or more of the following: city defined post location number, street name and closest civic number, latitude & longitude coordinates as defined by a GPS system, parking rates, parking time limit, allowed parking periods, and payment required parking periods.

8. An electronic parking meter as claimed in claim 1 wherein the pre-selected group of electronic meters is determined by location.

9. An electronic parking meter as claimed in claim 8 wherein the pre-selected group of electronic meters is determined by geographical location.

10. A method of configuring an electronic parking meter having a replaceable electronic metering device within a meter housing, comprising:

mounting a memory device within the housing separate from the replaceable electronic metering device;

storing configuration information associated with a pre-selected group of one or more electronic meters within the memory device; and coupling the memory device to the electronic metering device for loading the configuration information into the replaceable electronic metering device.

11. A method of configuring an electronic parking meter as claimed in claim 10, which further includes storing parking meter status information within the memory device.

12. A method of configuring an electronic parking meter as claimed in claim 11, which further includes accessing the memory device from the exterior of the meter housing.

13. A method of configuring an electronic parking meter as claimed in claim 10, which further includes providing a real time clock chip within the memory device.

14. A method of configuring an electronic parking meter as claimed in claim 10 wherein the pre-selected group of electronic meters are selected by location.

15. A method of configuring an electronic parking meter having a replaceable electronic metering device within a meter housing, comprising:

mounting a memory device within the housing separate from the replaceable electronic metering device, wherein configuration information associated with a pre-selected group of one or more meters is stored within the memory device; and coupling the memory device to the replaceable electronic metering device for loading the configuration information into the electronic metering device.

16. A method of configuring an electronic parking meter as claimed in claim 15, which further includes storing parking meter status information within the memory device.

17. A method of configuring an electronic parking meter as claimed in claim 16, which further includes accessing the memory device from the exterior of the meter housing.

18. A method of configuring an electronic parking meter as claimed in claim 15, which further includes providing a real time clock chip within the memory device.

19. A method of configuring an electronic parking meter as claimed in claim 15 wherein the pre-selected group of electronic meters are selected by location.

20. A method of replacing a replaceable electronic metering device within a meter housing of an electronic meter, comprising:

removing the replaceable electronic metering device from the meter housing;

maintaining configuration information associated with the electronic meter in storage in a memory device mounted in the meter housing;

inserting a replacement replaceable electronic metering device within the meter housing; and loading the configuration information stored in the memory device mounted in the meter housing into the replacement electronic metering device.

21. A method as claimed in claim 20 wherein the configuration information is common to a group of electronic meters pre-selected by location.

22. A method as claimed in claim 20 wherein the configuration information is common to a group of electronic meters pre-selected by geographical location.

23. A method as claimed in claim 20 wherein the configuration information includes parking meter location and/or parking restriction information.

24. A method as claimed in claim 23 wherein the configuration information is selected from the group consisting of one or more of the following: city defined post location number, street name and closest civic number, latitude & longitude coordinates as defined by a GPS system, parking rates, parking time limit, allowed parking periods, and payment required parking periods.

* * * * *

UNITED STATES PATENT AND TRADEMARK OFFICE
CERTIFICATE OF CORRECTION

PATENT NO.   : 6,747,575 B2
DATED        : June 8, 2004
INVENTOR(S)  : Chauvin et al.

It is certified that error appears in the above-identified patent and that said Letters Patent is hereby corrected as shown below:

Column 5,
Line 61, "device to the electronic" should be -- device to the replaceable electronic --.

Signed and Sealed this

Twenty-third Day of May, 2006

JON W. DUDAS
*Director of the United States Patent and Trademark Office*